United States Patent [19]
Hajek, Jr.

[11] Patent Number: 5,709,368
[45] Date of Patent: Jan. 20, 1998

[54] HYDRAULIC CONTROL VALVE FOR FLUID METERING AND CYLINDER PROTECTION

[75] Inventor: Thomas J. Hajek, Jr., Lockport, Ill.

[73] Assignee: Caterpillar Inc., Peoria, Ill.

[21] Appl. No.: 703,296

[22] Filed: Aug. 26, 1996

[51] Int. Cl.$^6$ .................................................. F16K 31/12
[52] U.S. Cl. ........................... 251/30.02; 137/487.5; 137/489.5
[58] Field of Search .................. 251/30.01, 30.02, 251/26, 44; 137/489.5, 492.5, 487.5

[56] References Cited

U.S. PATENT DOCUMENTS

| | | | |
|---|---|---|---|
| 5,042,775 | 8/1991 | Willemsen | 251/30.02 |
| 5,301,920 | 4/1994 | Ichiki | 251/30.02 X |
| 5,350,152 | 9/1994 | Hutchison et al. | |
| 5,421,545 | 6/1995 | Schexnayder | |

FOREIGN PATENT DOCUMENTS 3306317  8/1984  Germany ........................ 251/30.02

*Primary Examiner*—Kevin Lee
*Attorney, Agent, or Firm*—John W. Grant

[57] ABSTRACT

A hydraulic control valve for minimizing fluid leakage from a load actuating cylinder and for protecting the cylinder from damage has a composite valve body with a poppet slidably disposed in a bore and biased to the closed position. A pilot spool, controllable by a proportional solenoid regulates pilot pressure. Regulated pilot pressure allows for accurate control of the poppet for metering fluid from cylinder to tank. A force feedback spring disposed between the poppet and the pilot spool exerts a force on the pilot spool equivalent to the force from the proportional solenoid keeping the forces in equilibrium. Pilot pressure is adjusted to establish the relief pressure setting for the hydraulic control valve while conical sealing surfaces, minimize fluid leakage from cylinder to tank.

8 Claims, 1 Drawing Sheet

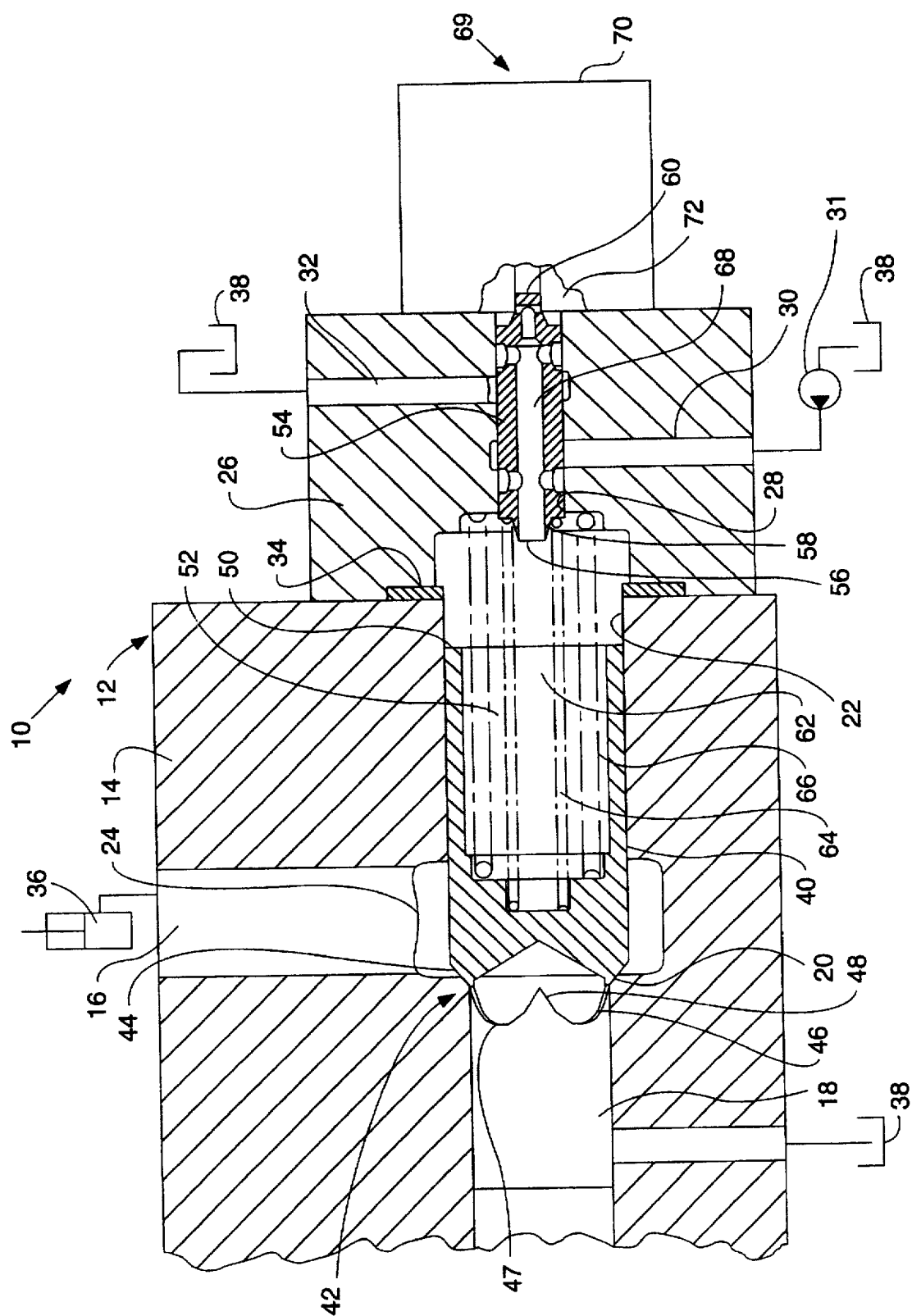

HYDRAULIC CONTROL VALVE FOR FLUID METERING AND CYLINDER PROTECTION

TECHNICAL FIELD

This invention relates generally to a hydraulic control valve and more particularly to a hydraulic control valve which controllably meters fluid from a load actuating cylinder to a tank while minimizing fluid leakage and protecting the cylinder from damage.

BACKGROUND ART

Hydraulic control valves used for fluid metering commonly have a poppet controllably moveable in response to a pilot spool. System pressure is communicated to both an actuation chamber and a control chamber which are disposed at opposite end portions of the poppet. Differential pressure between the two chambers controls fluid metering.

An example of such a hydraulic control valve is shown in U.S. Pat. No. 5,421,545 issued to Caterpillar Inc. on Jun. 6, 1995.

One of the problems associated with system pressure acting on both ends of the popper is that a separate relief valve is needed to provide a pressure relief function.

Another problem is that the relief pressure setting of the separate relief valve controlled separately from the main valve elements and is therefore not easily adjustable.

Additionally, fluid leakage past the popper is a problem that increases the likelihood of unwanted movement of the load actuating cylinder connected to the hydraulic control valve.

The present invention is directed to overcoming one or more of the problems as set forth above.

DISCLOSURE OF THE INVENTION

In one aspect of the present invention, a hydraulic control valve is adapted for metering fluid from a load actuating cylinder to a tank.

A composite valve body has a first port, a second port, a valve seat disposed between the first and second ports, a first bore in communication with the first and second ports, a second bore in communication with the first bore, and an inlet and an outlet opening into the second bore.

A popper, having a first end portion and a second end portion, is slidably disposed within the first bore and is controllably moveable between a closed position and an open position, the first end portion being in sealing engagement with the valve seat when the poppet is in the closed position.

A pilot spool, having a first end portion and a second end portion, is slidably disposed within the second bore. The first end portion of the pilot spool, in cooperation with the second end portion of the popper, defines a chamber within the valve body. The pilot spool is moveable, in response to an input force, between a first position at which communication is established between the inlet and the chamber and a second position at which communication is established between the chamber and the outlet.

A force feedback spring is disposed between the poppet and the pilot spool.

A device is provided for applying an input force to the pilot spool second end portion sufficient to urge the pilot spool to the second position.

BRIEF DESCRIPTION OF THE DRAWING

The sole FIGURE is a cross-sectional view of an embodiment of the present invention.

BEST MODE FOR CARRYING OUT THE INVENTION

With reference to the drawing, a hydraulic control valve 10 includes a composite valve body 12 having a first valve portion 14 suitably joined with a second valve portion 26. The first valve portion 14 has a first port 16 in communication with a cylinder 36, a second port 18 in communication with a tank 38, a valve seat 20 disposed between the first and second ports 16, 18 and a first bore 22 in communication with the ports 16, 18. In a preferred embodiment of the valve seat 20, the geometry is conical. An annulus 24 assists communication of the first port 16 with the first bore 22. The conical valve seat 20 is disposed within one wall of the annulus 24 and both the conical valve seat 20 and the annulus 24 are in axial alignment with the first bore 22. The second valve portion 26 has a second bore 28 in axial alignment with the first bore 22. An inlet 30 and an outlet 32 open into the second bore 28. A pilot pump 31 draws fluid from the tank 38 and delivers the pressurized pilot fluid to the inlet 30. The outlet 32 communicates fluid to the tank 38. The first valve portion 14 and the second valve portion 26 of the composite valve body 12 are mated with a seal 34 disposed at the interface of the two valve portions.

A popper 40 is slidably disposed within the first bore 22 to control fluid flow from the cylinder 36 to the tank 38. A conical sealing surface 44 formed on a first end portion 42 of the poppet 40 sealingly engages the conical valve seat 20 when the poppet 40 is in the closed position. A reduced diameter tubular portion 46 located adjacent the conical sealing surface 44 is slidably disposed within the second port 18. A plurality of v-shaped metering slots 48 extend through a wall 47 to allow a progressive increase in fluid flow from the cylinder 36 to the tank 38 when the popper 40 moves to an open position. The poppet 40 has a second end portion 50 and a cavity 52 recessed within the second end portion 50.

A pilot spool 54 is slidably disposed within the second bore 28 to control fluid flow at the inlet 30 and the outlet 32. The pilot spool 54 has a tapered portion 58 formed on a first end portion 56 to guide a force feedback spring 64 disposed between the pilot spool 54 and the poppet 40. A biasing spring 66 is also disposed between the pilot spool 54 and the poppet 40. The first end portion 56 cooperates with the poppet second end portion 50 to define a chamber 62 within the composite valve body 12. The pilot spool 54 has a second end portion 60 positioned to receive an input force.

A defining means 68 defines a passage communicating the chamber 62 with the pilot spool's second end portion 60 and in the preferred embodiment, is axially disposed through the center of the pilot spool 54. Alternatively, the defining means 68 can be an integral part of the composite valve body 12.

An applying means 69 for applying an input force to the pilot spool second end portion 60 is connected to the composite valve body 12 and cooperates with the second end portion 60 to define a second end chamber 72. In the preferred embodiment, the applying means 69 is a proportional solenoid 70. Alternatively, the applying means 69 can be a mechanical lever.

Industrial Applicability

A typical use of the hydraulic control valve 10 is for precisely metering fluid from the cylinder 36 to the tank 38 while minimizing fluid leakage from the cylinder 36 and protecting the cylinder 36 from damage. The hydraulic control valve 10 could be applied, for example, to the lift cylinders of a wheel loader for precise lowering of the bucket. Additionally, bucket drift could be reduced due to the minimization of fluid leakage from cylinder to tank. Furthermore, the cylinders would receive protection from potentially damaging pressure spikes that could occur if the wheel loader travels over rough terrain with a loaded bucket.

The same principal could apply to other devices using hydraulic cylinders such as an amusement ride, an automotive lift, a telescopic material handler, and the like.

As viewed in the drawing, the pilot pump 31 delivers pressurized fluid to the hydraulic control valve 10 which enters the inlet 30 and is allowed to travel into the chamber 62 and the second end chamber 72. This pilot pressure acts on the poppet's second end portion 50 as well as the pilot spool's second end portion 60 while the outlet 32 is blocked by the pilot spool 54. The pilot pressure acting on the poppet's second end portion 50 in conjunction with the biasing spring 66 and the force feedback spring 64 urges the popper 40 leftward to the closed position in which the conical sealing surface 44 is in sealing engagement with the conical valve seat 20, preventing leakage from the cylinder 36.

To precisely meter fluid from the cylinder 36 to the tank 38, the poppet 40 is controllably moved rightward to an open position to establish communication between the first and second ports 16, 18. To achieve this, the pilot spool's second end portion 60 receives an input force from the proportional solenoid 70 sufficient to urge the pilot spool 54 leftward blocking communication from the inlet 30 to the chamber 62 and establishing communication between the chamber 62 and the outlet 32. This allows fluid to travel from the chamber 62 to the outlet 32, which lowers the pressure acting on the poppet's second end portion 50. The decrease in pressure acting on the poppet's second end portion 50 enables the higher pressure from the cylinder 36, acting on the conical sealing surface 44, to urge the poppet 40 rightward to an open position thus compressing the biasing spring 66 and the force feedback spring 64. With the poppet 40 in this open position, fluid travels from the cylinder 36 through the first port 16, around the annulus 24, across the conical valve seat 20, through the v-shaped metering slots 48, into the second port 18, and out to the tank 38.

The compressed force feedback spring 64 exerts a reaction force on the pilot spool 54 equivalent to the force from the proportional solenoid 70, keeping the forces in equilibrium. Removing the input force allows the force feedback spring 64 to urge the pilot spool 54 rightward to the position in which pilot pressure at the inlet 30 is in communication with the chamber 62 and the outlet 32 is blocked. This results in the combined force of the biasing spring 66, the force feedback spring 64, and the pilot pressure acting on the poppet's second end portion 50 to urge the popper 40 leftward to the closed position.

Another example of operation is using pilot pressure as the relief pressure setting for the cylinder 36. If the pressure in the cylinder 36, acting on the annular area of the conical sealing surface 44, generates a force greater than the combination of forces attributed to the biasing spring 66, the force feedback spring 64, and the pilot pressure acting on the poppet's second end portion 50, then the poppet moves rightward to an open position to vent some fluid from the cylinder 36 to the tank 38.

Fluid is vented from the cylinder 36 to the tank 38 until the pressure in the cylinder 36 is equal to or lower than the relief pressure setting determined by the pilot pressure acting on the poppet's second end portion 50. When the pressure in the cylinder 36 is equal to or less than the relief pressure setting, the poppet 40 is urged leftward to the closed position by the biasing spring 66, the force feedback spring 64, and the pilot pressure.

Adjustability of the relief pressure setting can be achieved by altering the input force applied to the pilot spool's second end portion 60, causing movement of the pilot spool 54 which controls fluid flow entering the hydraulic control valve 10 through the inlet 30. Similarly, the relief pressure setting can be altered by varying the output from the pilot pump which supplies fluid to the hydraulic control valve 10.

Other aspects, objects and advantages of this invention can be obtained from a study of the drawing, the disclosure and the appended claims.

I claim:

1. A hydraulic control valve adapted for metering fluid from a load actuating cylinder to a tank, comprising:

a composite valve body having a first port, a second port, a valve seat disposed between the first and second ports, a first bore in communication with the first and second ports, a second bore in communication with the first bore, an inlet and an outlet opening into the second bore, the inlet being devoid of communication with the first port;

a poppet having a first end portion and a second end portion and being slidably disposed within the first bore and controllably moveable between a closed position and an open position, the first end portion being in sealing engagement with the valve seat when the poppet is in the closed position;

a pilot spool having a first end portion and a second end portion slidably disposed within the second bore, the first end portion of the pilot spool in cooperation with the second end portion of the poppet defining a chamber within the composite valve body, the pilot spool moveable, in response to an input force, between a first position at which communication is established between the inlet and the chamber and a second position at which communication is established between the chamber and the outlet;

a force feedback spring disposed between the poppet and the pilot spool;

means defining a passage communicating the chamber with the second end portion of the pilot spool; and means for applying an input force to the second end portion of the pilot spool, said force being sufficient to urge the pilot spool to the second position.

2. The hydraulic control valve, as set forth in claim 1, wherein the valve seat is conical.

3. The hydraulic control valve, as set forth in claim 1, wherein the poppet has a conical sealing surface on the first end portion.

4. The hydraulic control valve as set forth in claim 3, wherein the first end portion of the poppet has a reduced diameter tubular portion located adjacent the conical sealing surface and slidably disposed within the second port, the reduced diameter tubular portion having a plurality of v-shaped metering slots.

5. The hydraulic control valve, as set forth in claim 4, wherein the second end portion of the poppet has a cavity adapted to receive the force feedback spring.

6. The hydraulic control valve, as set forth in claim 1, wherein the means for applying an input force is a proportional solenoid connected to the composite valve body and cooperating therewith to define a second end chamber at the second end portion of the pilot spool.

7. A hydraulic control valve adapted for metering fluid from a load actuating cylinder to a tank, comprising:

a composite valve body having a first port, a second port, a valve seat disposed between the first and second ports, a first bore in communication with the first and second ports, a second bore in communication with the first bore, an inlet and an outlet opening into the second bore;

a pilot pump connected to the inlet;

a poppet having a first end portion and a second end portion and being slidably disposed within the first bore and controllably moveable between a closed position and an open position, the first end portion being in sealing engagement with the valve seat when the poppet is in the closed position;

a pilot spool having a first end portion and a second end portion slidably disposed within the second bore, the first end portion of the pilot spool in cooperation with the second end portion of the poppet defining a chamber within the composite valve body, the pilot spool moveable, in response to an input force, between a first position at which communication is established between the inlet and the chamber and a second position at which communication is established between the chamber and the outlet;

a force feedback spring disposed between the poppet and the pilot spool;

means defining a passage communicating the chamber with the second end portion of the pilot spool; and means for applying an input force to the second end portion of the pilot spool, said force being sufficient to urge the pilot spool to the second position.

8. The hydraulic control valve, as set forth in claim 7, wherein the means for applying an input force is a proportional solenoid connected to the composite valve body and cooperating therewith to define a second end chamber at the second end portion of the pilot spool.

\* \* \* \* \*